United States Patent
Hu et al.

(10) Patent No.: US 9,801,079 B2
(45) Date of Patent: Oct. 24, 2017

(54) METHOD AND APPARATUS FOR OBTAINING NEIGHBORING CELL INFORMATION

(71) Applicant: Huawei Technologies Co., Ltd., Shenzhen (CN)

(72) Inventors: Chunli Hu, Shenzhen (CN); Hailong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/645,128

(22) Filed: Mar. 11, 2015

(65) Prior Publication Data
US 2015/0189522 A1 Jul. 2, 2015

Related U.S. Application Data

(63) Continuation of application No. PCT/CN2012/081246, filed on Sep. 11, 2012.

(51) Int. Cl.
*H04W 24/02* (2009.01)
*H04W 36/00* (2009.01)
*H04W 84/04* (2009.01)

(52) U.S. Cl.
CPC ....... *H04W 24/02* (2013.01); *H04W 36/0061* (2013.01); *H04W 84/045* (2013.01)

(58) Field of Classification Search
CPC . H04W 24/02; H04W 36/0061; H04W 48/16; H04W 8/26; H04W 16/12;
(Continued)

(56) References Cited

U.S. PATENT DOCUMENTS 8,737,236 B2 * 5/2014 Bakker ............... H04W 76/021
370/242
2007/0161373 A1 7/2007 Klatt
(Continued)

FOREIGN PATENT DOCUMENTS

CN 102088756 A 6/2011
CN 102238572 A 11/2011
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)," 3GPP TS 36.300, V11.2.0, pp. 1-201, 3rd Generation Partnership Project, Valbonne, France (Jun. 2012).

*Primary Examiner* — Magdi Elhag
(74) *Attorney, Agent, or Firm* — Leydig, Voit & Mayer, Ltd.

(57) ABSTRACT

Embodiments of the present invention provide a method and an apparatus for obtaining neighboring cell information. The method includes: receiving identifier information of a neighboring cell sent by a base station; when finding a first CGI, determining whether the first CGI is the same as the CGI comprised in the identifier information of the neighboring cell; when the first CGI is the same as the CGI comprised in the identifier information of the neighboring cell, determining the CGI comprised in the identifier information of the neighboring cell as a CGI of the neighboring cell; and sending, to the base station, information used for indicating the CGI of the neighboring cell. The method and apparatus for obtaining neighboring cell information according to the embodiments of the present invention may better implement an ANR function.

20 Claims, 6 Drawing Sheets

(58) Field of Classification Search
CPC ..... H04W 16/14; H04W 16/24; H04W 24/04; H04W 76/021
USPC ........................................................ 455/446
See application file for complete search history.

(56) References Cited

U.S. PATENT DOCUMENTS

| | | |
|---|---|---|
| 2010/0040019 A1 | 2/2010 | Tinnakornsrisuphap et al. |
| 2010/0075681 A1* | 3/2010 | Olofsson ............... H04W 16/24 455/436 |
| 2011/0038326 A1* | 2/2011 | Davies .................... H04W 8/26 370/329 |
| 2011/0070897 A1 | 3/2011 | Tang et al. |
| 2011/0237258 A1* | 9/2011 | Nylander ............. H04J 11/0093 455/437 |
| 2012/0230296 A1 | 9/2012 | Hapsari et al. |
| 2012/0275315 A1* | 11/2012 | Schlangen ............ H04W 24/02 370/242 |
| 2012/0315913 A1 | 12/2012 | Yang et al. |
| 2015/0181443 A1* | 6/2015 | Hu .................... H04W 36/0061 455/434 |

FOREIGN PATENT DOCUMENTS

| | | |
|---|---|---|
| CN | 102244877 A | 11/2011 |
| CN | 102256284 A | 11/2011 |
| CN | 102484826 A | 5/2012 |
| EP | 2469924 A1 | 6/2012 |
| GB | 2472792 A | 2/2011 |
| RU | 2011105431 A | 8/2012 |
| WO | WO 2010047647 A1 | 4/2010 |
| WO | WO 2010083659 A1 | 7/2010 |
| WO | WO 2010120837 A1 | 10/2010 |

\* cited by examiner

METHOD AND APPARATUS FOR OBTAINING NEIGHBORING CELL INFORMATION

CROSS-REFERENCE

This application is a continuation of International Patent Application No. PCT/CN2012/081246, filed on Sep. 11, 2012, which is hereby incorporated by reference in its entirety.

TECHNICAL FIELD

The present invention relates to the field of communications, and in particular, to a method and an apparatus for obtaining neighboring cell information.

BACKGROUND

An operator intending to establish a network independently needs to pay a high spectrum license fee and network deployment cost, and also needs to face a pressure on a requirement of providing high network coverage in a short period of time and a challenge of site deployment, so a concept of network sharing is proposed. Any cooperation or sharing of a telecommunication network infrastructure or a network device to any extent involving multiple operators (or third parties) may be called network sharing. The sharing of the telecommunication network infrastructure may include sharing of site infrastructures such as a site address, an equipment room facility, an iron tower, and a power supply device, and the sharing of the network device may include sharing of facilities related to a telecommunication network device such as a base station, transmission, and a core network. The network sharing can greatly save an investment cost, speed up network establishment, shorten a period of network establishment, and increase network coverage of an operator.

Currently, multiple operators have various sharing forms. Because an operator expects to save a network establishment cost as much as possible and have a control right on a wireless network, more and more operators start paying attention to sharing of a radio access network. The sharing of the radio access network gradually becomes an important technology being widely concerned about and commercially used successfully. In a network where a radio access network is shared by multiple operators, users of the multiple operators may share a same base station/cell.

Therefore, in 3GPP TS 36.300, an Automatic Neighbor Relation ("ANR") function is defined, so as to implement operations such as automatic addition and deletion of a neighbor relation. The ANR function depends on a standard ANR terminal, where the standard ANR terminal refers to a terminal that can detect a Cell Global Identifier ("CGI") of a neighboring cell after detecting a configuration message delivered by a base station.

However, because a CGI of a neighboring cell learned by a user may be incorrect, the base station is affected from implementing the ANR function.

SUMMARY

Embodiments of the present invention provide a method and an apparatus for obtaining neighboring cell information, which can obtain a correct CGI of a neighboring cell of a base station, so that the base station may better implement an ANR function.

In a first aspect, a method for obtaining neighboring cell information is provided and includes:

receiving identifier information of a neighboring cell sent by a base station, where a CGI and a PCI that are included in the identifier information of the neighboring cell are obtained for the neighboring cell and sent to the base station by a user equipment;

when finding a first CGI according to cell information, and the CGI and the PCI that are included in the identifier information of the neighboring cell, determining whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell;

when the first CGI is different from the CGI included in the identifier information of the neighboring cell, determining the first CGI as a CGI of the neighboring cell;

when the first CGI is the same as the CGI included in the identifier information of the neighboring cell, determining the CGI included in the identifier information of the neighboring cell as a CGI of the neighboring cell; and sending, to the base station, information used for indicating the CGI of the neighboring cell.

With reference to the first aspect, in a first possible implementation manner of the first aspect, the method further includes:

obtaining, according to the CGI of the neighboring cell and a correspondence between all or part of information in the CGI and a public land mobile network PLMN information set, a PLMN information set corresponding to the neighboring cell; and sending, to the base station, the PLMN information set corresponding to the neighboring cell.

With reference to the first possible implementation manner of the first aspect, in a second possible implementation manner of the first aspect, the obtaining, according to the CGI of the neighboring cell and a correspondence between all or part of information in the CGI and a PLMN information set, a PLMN information set corresponding to the neighboring cell includes:

determining, according to the CGI of the neighboring cell and a correspondence between the CGI and a PLMN information set, the PLMN information set corresponding to the neighboring cell.

With reference to the first possible implementation manner of the first aspect, in a third possible implementation manner of the first aspect, the obtaining, according to the CGI of the neighboring cell and a correspondence between all or part of information in the CGI and a PLMN information set, a PLMN information set corresponding to the neighboring cell includes:

determining, according to a PLMN identifier id included in the CGI of the neighboring cell and a correspondence between the PLMN id in the CGI and a PLMN information set, the PLMN information set corresponding to the neighboring cell.

With reference to the first possible implementation manner of the first aspect, in a fourth possible implementation manner of the first aspect, the obtaining, according to the CGI of the neighboring cell and a correspondence between all or part of information in the CGI and a PLMN information set, a PLMN information set corresponding to the neighboring cell includes:

determining, according to a base station id and a cell id that are included in the CGI of the neighboring cell and a correspondence between the base station id and the cell id in the CGI and a PLMN information set, the PLMN information set corresponding to the neighboring cell.

With reference to the first possible implementation manner of the first aspect, in a fifth possible implementation manner of the first aspect, the obtaining, according to the CGI of the neighboring cell and a correspondence between all or part of information in the CGI and a PLMN information set, a PLMN information set corresponding to the neighboring cell includes:

obtaining, according to a PLMN id included in the CGI of the neighboring cell and a correspondence between the PLMN id and a first correspondence, a first correspondence corresponding to the PLMN id included in the CGI of the neighboring cell, where the first correspondence is a correspondence between a base station id, a cell id and a PLMN information set; and determining, according to the base station id and cell id included in the CGI of the neighboring cell and the first correspondence corresponding to the PLMN id included in the CGI of the neighboring cell, the PLMN information set corresponding to the neighboring cell.

With reference to the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the PLMN information set includes: a PLMN id set; or includes:

a PLMN id and operator state set.

In a second aspect, a method for obtaining neighboring cell information is provided, including:

sending identifier information of a neighboring cell to an OSS, where a CGI and a PCI that are included in the identifier information of the neighboring cell are obtained for the neighboring cell and sent to a base station by a user equipment, so that when finding a first CGI according to cell information, and the CGI and the PCI that are included in the identifier information of the neighboring cell, the OSS determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and when the first CGI is the same as the CGI included in the identifier information of the neighboring cell, determines the CGI included in the identifier information of the neighboring cell as a CGI of the neighboring cell; and receiving information that indicates the CGI of the neighboring cell and that is sent by the OSS.

With reference to the second aspect, in a first possible implementation manner of the second aspect, the method further includes:

receiving a PLMN information set that corresponds to the neighboring cell and that is sent by the OSS.

In a third aspect, an OSS is provided, including:

a receiving unit, configured to receive identifier information of a neighboring cell sent by a base station, where a CGI and a PCI that are included in the identifier information of the neighboring cell are obtained for the neighboring cell and sent to the base station by a user equipment;

a first determining unit, configured to: when finding a first CGI according to cell information, and the CGI and the PCI that are included in the identifier information of the neighboring cell, determine whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell;

a second determining unit, configured to: when the first CGI is different from the CGI included in the identifier information of the neighboring cell, determine the first CGI as a CGI of the neighboring cell, and when the first CGI is the same as the CGI included in the identifier information of the neighboring cell, determine the CGI included in the identifier information of the neighboring cell as a CGI of the neighboring cell; and a sending unit, configured to send, to the base station, information used for indicating the CGI of the neighboring cell.

With reference to the third aspect, in a third possible implementation manner of the third aspect, the OSS further includes:

an obtaining unit, configured to obtain, according to the CGI of the neighboring cell and a correspondence between all or part of information in the CGI and a public land mobile network PLMN information set, a PLMN information set corresponding to the neighboring cell, where the sending unit is further configured to send, to the base station, the PLMN information set corresponding to the neighboring cell.

With reference to the third possible implementation manner of the third aspect, in a second possible implementation manner of the third aspect, the obtaining unit is specifically configured to:

determine, according to the CGI of the neighboring cell and a correspondence between the CGI and a PLMN information set, the PLMN information set corresponding to the neighboring cell.

With reference to the third possible implementation manner of the third aspect, in a third possible implementation manner of the third aspect, the obtaining unit is specifically configured to:

determine, according to a PLMN identifier id included in the CGI of the neighboring cell and a correspondence between the PLMN id in the CGI and a PLMN information set, the PLMN information set corresponding to the neighboring cell.

With reference to the third possible implementation manner of the third aspect, in a fourth possible implementation manner of the third aspect, the obtaining unit is specifically configured to:

determine, according to a base station id and a cell id included in the CGI of the neighboring cell and a correspondence between the base station id and the cell id in the CGI and a PLMN information set, the PLMN information set corresponding to the neighboring cell.

With reference to the first possible implementation manner of the third aspect, in a fifth possible implementation manner of the third aspect, the obtaining unit is specifically configured to:

obtain, according to a PLMN id included in the CGI of the neighboring cell and a correspondence between the PLMN id and the first correspondence, a first correspondence corresponding to the PLMN id included in the CGI of the neighboring cell, where the first correspondence is a correspondence between a base station id, a cell id and a PLMN information set; and determine, according to the base station id and cell id included in the CGI of the neighboring cell and the first correspondence corresponding to the PLMN id included in the CGI of the neighboring cell, the PLMN information set corresponding to the neighboring cell.

In a fourth aspect, a base station is provided, including:

a sending unit, configured to send identifier information of a neighboring cell to an OSS, where a CGI and a PCI that are included in the identifier information of the neighboring cell are obtained for the neighboring cell and sent to the base station by a user equipment, so that when finding a first CGI according to cell information, and the CGI and the PCI that are included in the identifier information of the neighboring cell, the OSS determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and when the first CGI is the same as the CGI included in the identifier information of the neighboring cell, determines the CGI included in the identifier information of the neighboring cell as a CGI of the neighboring cell; and a receiving unit, configured to receive information that indicates the CGI of the neighboring cell and that is sent by the OSS.

With reference to the fourth aspect, in a first possible implementation manner of the fourth aspect, the receiving unit is further configured to:

receive a PLMN information set that corresponds to the neighboring cell and that is sent by the OSS.

Therefore, in the embodiments of the present invention, identifier information of a neighboring cell sent by a base station is received, where a CGI and a PCI that are included in the identifier information of the neighboring cell are obtained for the neighboring cell and sent to the base station by a user equipment, when a first CGI is found according to cell information, and the CGI and the PCI that are included in the identifier information of the neighboring cell, it is determined whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, the first CGI is determined as a CGI of the neighboring cell, and when the first CGI is the same as the CGI included in the identifier information of the neighboring cell, the CGI included in the identifier information of the neighboring cell is determined as a CGI of the neighboring cell, a PLMN information set corresponding to the neighboring cell is sent to the base station, and information used for indicating the CGI of the neighboring cell is sent, so that the base station may obtain a correct CGI of the neighboring cell, and the base station may better implement an ANR function.

BRIEF DESCRIPTION OF DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

It should be understood that technical solutions of embodiments of the present invention may be applied to various communication systems, such as a Global System for Mobile communications ("GSM") system, a Code Division Multiple Access ("CDMA") system, a Wideband Code Division Multiple Access ("WCDMA") system, a General Packet Radio Service ("GPRS"), a Long Term Evolution ("LTE") system, an LTE Frequency Division Duplex ("FDD") system, an LTE Time Division Duplex ("TDD"), and a Universal Mobile Telecommunication System ("UMTS").

A user equipment ("UE") and a mobile terminal, which may also be called a user, a mobile user equipment, or the like, may perform communication with one or more core networks through a radio access network (for example, Radio Access Network, "RAN"). The user may be a mobile terminal such as a mobile phone (or referred to as a "cellular" phone), and a computer having a mobile terminal, for example, a portable, pocket, handheld, computer built-in, or vehicle-mounted mobile apparatus, which exchange language and/or data with the radio access network.

A base station may be a base station (Base Transceiver Station, "BTS") in a Global System for Mobile communications ("GSM") or CDMA, may also be a base station (NodeB) in WCDMA, and may also be an evolved base station ("eNB or e-NodeB") in LTE.

Figure 1:
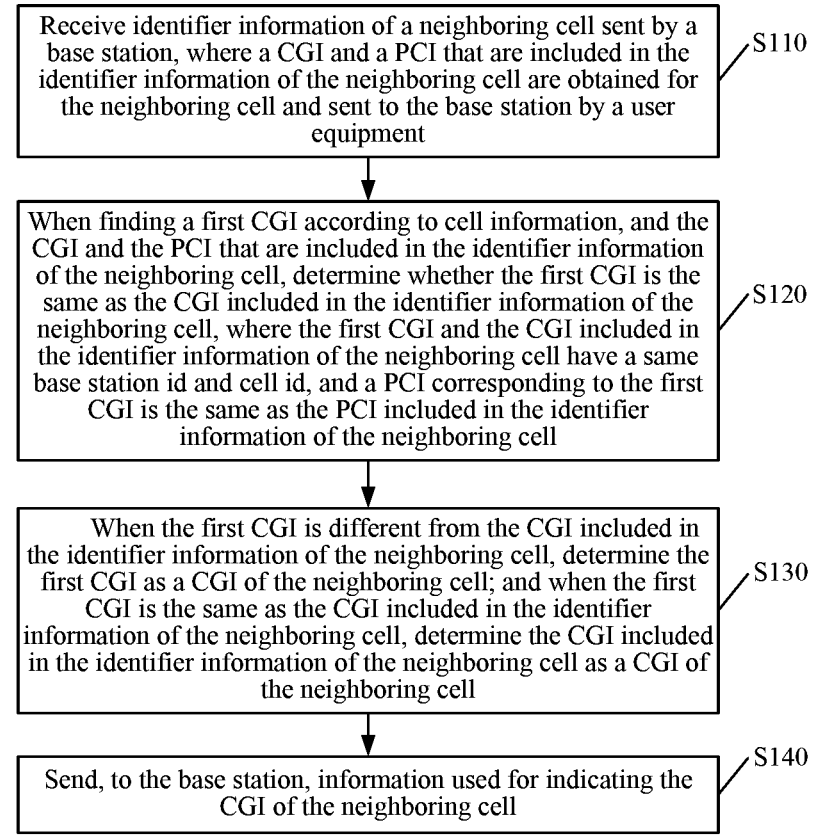
FIG. 1 is a schematic flow chart of a method for obtaining neighboring cell information according to an embodiment of the present invention.

FIG. 1 is a schematic flow chart of a method 100 for obtaining neighboring cell information according to an embodiment of the present invention. The method 100 is executed by an Operation Support System ("OSS"), and as shown in FIG. 1, the method 100 includes:

S110: Receive identifier information of a neighboring cell sent by a base station, where a CGI and a Physical Cell Identifier ("PCI") that are included in the identifier information of the neighboring cell are obtained for the neighboring cell and sent to the base station by a user equipment.

S120: When finding a first CGI according to cell information, and the CGI and the PCI that are included in the identifier information of the neighboring cell, determine whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell.

S130: When the first CGI is different from the CGI included in the identifier information of the neighboring cell, determine the first CGI as a CGI of the neighboring cell;

when the first CGI is the same as the CGI included in the identifier information of the neighboring cell, determine the CGI included in the identifier information of the neighboring cell as a CGI of the neighboring cell.

S140: Send, to the base station, information used for indicating the CGI of the neighboring cell.

Figure 2:
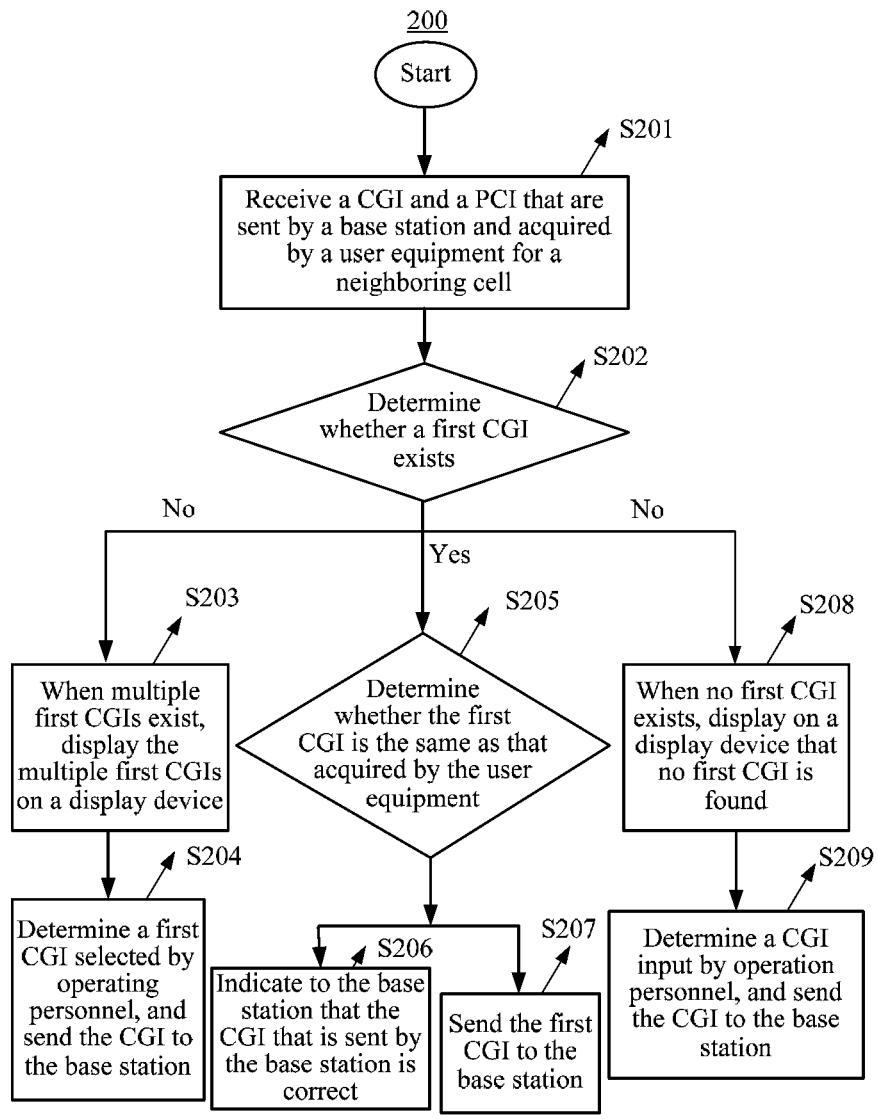
FIG. 2 is a schematic flow chart of a method for obtaining neighboring cell information according to another embodiment of the present invention.
Figure 3:
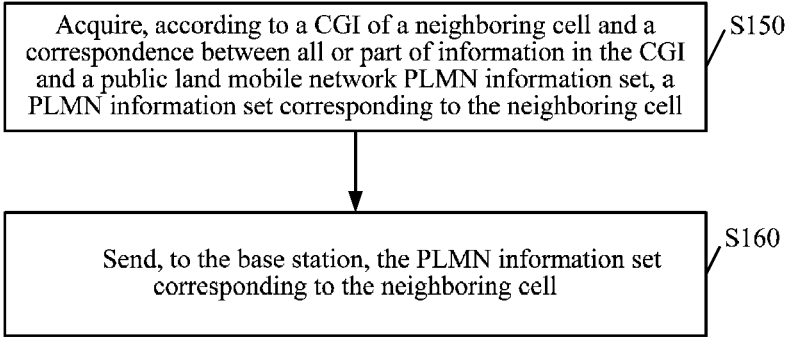
FIG. 3 is a schematic flow chart of a method for obtaining neighboring cell information according to another embodiment of the present invention.

In order to clearly understand the embodiment described in the foregoing, the following gives a detailed description with reference to FIG. 2.

FIG. 2 is a schematic flow chart of a method 200 for obtaining neighboring cell information according to an embodiment of the present invention. As shown in FIG. 2, the method 200 includes:

S201: Receive a CGI and a PCI sent by a base station and obtained by a user equipment for a neighboring cell.

Specifically, after the user equipment obtains the CGI and the PCI for the neighboring cell, the user equipment may report, to the base station, the PCI and the CGI obtained for the neighboring cell. If the base station needs to determine whether the CGI reported by the user equipment is correct, the base station may send, to an OSS, the CGI of the neighboring cell and the PCI of the neighboring cell reported by the user equipment, so that the OSS receives the CGI and the PCI that are sent by the base station and obtained by the user equipment for the neighboring cell of the base station.

S202: Determine whether a first CGI exists.

Specifically, after receiving the CGI and the PCI that are sent by the base station and obtained by the user equipment for the neighboring cell of the base station, the OSS may check, according to (base station id+cell id) in the CGI reported by the base station and obtained by the user equipment for the neighboring cell, whether a CGI having the same (base station id+cell id) as that of the CGI obtained by the user equipment for the neighboring cell exists in cell information preconfigured in the OSS, if one or more CGIs having the (base station id+cell id) same as those in the CGI obtained by the user equipment for the neighboring cell exist, compare a PCI respectively corresponding to the one or more found CGIs with the PCI of the neighboring cell (that is, the PCI obtained by the user equipment for the neighboring cell), so as to determine whether a PCI same as the PCI of the neighboring cell exists, that is, determine whether such a CGI (that is, the first CGI) exists that not only the (base station id+cell id) in the CGI is the same as the (base station id+cell id) in the CGI obtained by the user equipment for the neighboring cell but also the PCI corresponding to the CGI is also the same as the PCI of the neighboring cell (that is, the PCI obtained by the user equipment for the neighboring cell). If only one such CGI exists, execute S205 to S207; if multiple such CGIs exist, execute S203 and S204; and if no such CGI exists, execute S208 and S209.

S203 and S204 are steps subsequently performed when multiple first CGIs are found.

S203: When multiple first CGIs exist, display the multiple first CGIs on a display device.

Specifically, an OSS may display on a display device that multiple first CGIs exist, and operation personnel may select one CGI after viewing the multiple first CGIs on the display device.

S204: Determine one first CGI selected by the operation personnel, and send the CGI to the base station.

Specifically, the OSS may determine a correct CGI based on selection of the operation personnel, and send the correct CGI to the base station.

S205 to S207 are steps subsequently performed when one first CGI is found.

S205: Determine whether the first CGI is the same as that obtained by the user equipment.

Specifically, the OSS compares the first CGI found from preconfigured cell information with the CGI obtained by the user equipment for the neighboring cell, and if the first CGI is the same as the CGI obtained by the user equipment for the neighboring cell, execute S206; otherwise, execute S207.

S206: Indicate to the base station that the CGI that is sent by the base station is correct.

Specifically, the OSS may determine that the CGI obtained by the user equipment for the neighboring cell is correct, and send, to the base station, information used for indicating that the CGI obtained by the user equipment for the neighboring cell is correct, and definitely, the OSS may send the CGI to the base station directly.

S207: Send the first CGI to the base station.

The OSS may determine the first CGI obtained from the preconfigured cell information as a correct CGI of the neighboring cell, and send the correct CGI to the base station.

S208 and S209 are steps subsequently performed when the OSS does not find a first CGI.

S208: When no first CGI exists, display on a display device that no first CGI is found.

Specifically, the OSS may display on the display device that no correct CGI of the neighboring cell is found, so that the operation personnel performs a corresponding operation, for example, manually determining whether the CGI of the neighboring cell is correct, and if it is determined to be incorrect, inputting a correct CGI.

S209: Determine a CGI input by the operation personnel, and send the CGI to the base station.

Specifically, the OSS may determine a correct CGI based on the input of the operation personnel, and send the correct CGI to the base station.

It should be understood that, the manner of obtaining the correct CGI of the neighboring cell of the base station is only a specific implementation manner of the embodiment of the present invention, and the embodiment of the present invention may have other implementation manners, for example, after receiving the CGI and the PCI of the neighboring cell of the base station, the OSS may query a CGI corresponding to the PCI obtained by the user equipment for the neighboring cell of the base station from preconfigured cell information of the OSS, and then determine whether such a CGI, having a (base station id and cell id) same as that of the CGI obtained by the user equipment for the neighboring cell of the base station, exists among one or more found CGIs. If such a CGI exists, determine whether a PLMN id of the CGI is consistent with a PLMN id in the CGI obtained by the user equipment for the neighboring cell of the base station. If they are consistent, determine the CGI obtained by the user equipment for the neighboring cell of the base station is correct; if they are inconsistent, determine the first CGI as a correct CGI of the neighboring cell of the base station.

In the embodiment of the present invention, the method 100 may further include:

S150: Obtain, according to the CGI of the neighboring cell and a correspondence between all or part of information in the CGI and a public land mobile network PLMN information set, a PLMN information set corresponding to the neighboring cell.

S160: Send, to the base station, the PLMN information set corresponding to the neighboring cell.

That is, the OSS may further obtain, according to the determined correct CGI of the neighboring cell and a correspondence preconfigured in the OSS between all or part of information in a CGI and a PLMN information set, a PLMN information set corresponding to the neighboring cell, and send, to the base station, the PLMN information set corresponding to the neighboring cell, so that the base station may better implement an ANR function.

In the embodiment of the present invention, the obtaining, according to the CGI of the neighboring cell and a correspondence between all or part of information in the CGI and a PLMN information set, a PLMN information set corresponding to the neighboring cell in S150 may include:

determining, according to the CGI of the neighboring cell and a correspondence between the CGI and a PLMN information set, the PLMN information set corresponding to the neighboring cell.

Specifically, the OSS, after determining the CGI of the neighboring cell (that is, the correct CGI of the neighboring cell), may search for a PLMN information set corresponding to the CGI of the neighboring cell of the base station by searching the correspondence between the CGI and a PLMN information set, and send, to the base station, the PLMN information set corresponding to the CGI of the neighboring cell of the base station and the correct CGI of the neighboring cell of the base station.

Alternatively, in the embodiment of the present invention, the obtaining, according to the CGI of the neighboring cell and a correspondence between all or part of information in the CGI and a PLMN information set, a PLMN information set corresponding to the neighboring cell in S150 may include:

determining, according to a PLMN id included in the CGI of the neighboring cell and a correspondence between the PLMN id in the CGI and a PLMN information set, the PLMN information set corresponding to the neighboring cell.

Specifically, the OSS, after obtaining the CGI of the neighboring cell, may obtain a PLMN information set corresponding to the PLMN id in the CGI of the neighboring cell through searching for correspondence between the PLMN id and a PLMN information set according to the PLMN id in the CGI of the neighboring cell, and determine whether a PLMN id information set corresponding to the PLMN id in the CGI of the neighboring cell includes the PLMN id in the CGI of the neighboring cell, if yes, directly determine the PLMN information set corresponding to the PLMN id in the CGI of the neighboring cell as the PLMN information set corresponding to the neighboring cell, if not, add the PLMN id in the CGI of the neighboring cell to the PLMN id information set corresponding to the PLMN id in the CGI of the neighboring cell, so as to obtain the PLMN information set corresponding to the neighboring cell. For example, if cells of an operator A serve a same operator list, it is configured that an identifier A of the operator A corresponds to an operator identifier list, for example, a cell of the operator A is configured to a cell shared by operators A, B and C, and after the OSS receives a CGI of a neighboring cell of the base station sent by the base station, the OSS may obtain, according to a PLMN id in the CGI of the neighboring cell of the base station, a serving operator list (for example, the operators A, B and C) corresponding to the neighboring cell of the base station. For another example, if cells of an operator A serve a same operator list, it is configured that an identifier A of the operator A corresponds to an operator identifier list, for example, a cell of the operator A is configured to a cell shared by operators BC, and when a base station learns a cell of the operator A through a UE, the base station may obtain an operator list BC through configuration information, and because the obtained operator list does not include the operator A, the operator A may be added to the operator list BC, so as to obtain a serving operator list ABC of the cell.

Alternatively, in the embodiment of the present invention, the obtaining, according to the CGI of the neighboring cell and a correspondence between all or part of information in the CGI and a PLMN information set, a PLMN information set corresponding to the neighboring cell in S150 may include:

determining the PLMN information set corresponding to the neighboring cell, according to a (base station id+cell id) included in the CGI of the neighboring cell and a correspondence between the (base station id+cell id) in the CGI and a PLMN information set.

Specifically, after obtaining the CGI of the neighboring cell of the base station, the OSS may obtain, according to the (base station id+cell id) in the CGI of the neighboring cell of the base station, a PLMN information set corresponding to the neighboring cell of the base station. For example, configuration information of the OSS is as follows: When (eNB id+cell id) belongs to [x, x+y], a corresponding PLMN information set is {operator A, operator B}; when (eNB id+cell id) belongs to (x+y, x+y+z], a corresponding PLMN information set is {operator A}; when (eNB id+cell id) belongs to [x+y+z+a, x+y+z+a+b], a corresponding PLMN information set is {operator B, operator A}; and when (eNB id+cell id) belongs to an interval (x+y+z+a+b, x+y+z+a+b+c], a corresponding PLMN information set is {operator B}; therefore, after obtaining the CGI of the neighboring cell of the base station, the OSS may determine an interval to which (eNB id+cell id) in the CGI of the neighboring cell of the base station belongs. Assume that the interval to which (eNB id+cell id) in the CGI of the neighboring cell belongs is [x+y+z+a, x+y+z+a+b] and an included PLMN id is B, a PLMN information set corresponding to the neighboring cell is {operator B, operator A}.

Alternatively, in the embodiment of the present invention, the obtaining, according to the CGI of the neighboring cell and a correspondence between all or part of information in the CGI and a PLMN information set, a PLMN information set corresponding to the neighboring cell in S150 includes:

obtaining, according to the PLMN id included in the CGI of the neighboring cell and a correspondence between a PLMN id and a first correspondence, a first correspondence corresponding to the PLMN id included in the CGI of the neighboring cell, where the first correspondence is a correspondence between a base station id, a cell id and a PLMN information set; and determining, according to the (base station id and cell id) included in the CGI of the neighboring cell and the first correspondence corresponding to the PLMN id included in the CGI of the neighboring cell, the PLMN information set corresponding to the neighboring cell.

For example, configuration information in the OSS is as follows: When PLMN id=A, and (eNB id+cell id) belongs to an interval [x, x+y], a corresponding PLMN information set is {operator A, operator B}, and when (eNB id+cell id) belongs to an interval (x+y, x+y+z], a corresponding PLMN information set is {operator A}; when PLMN id=B, and (eNB id+cell id) belongs to an interval [a, a+b], a corresponding PLMN information set is {operator B, operator A}, and when (eNB id+cell id) belongs to an interval (a+b, a+b+c], a corresponding PLMN information set is {operator B}; therefore, the OSS, after receiving the CGI of the neighboring cell of the base station sent by the base station, may find a corresponding PLMN information set according to the PLMN id in the CGI and (eNB id+cell id). Assume that PLMN id=A, and (eNB id+cell id) belongs to an interval (x+y, x+y+z], a PLMN information set corresponding to the neighboring cell is {operator A}.

Therefore, in the method for obtaining neighboring cell information in the embodiment of the present invention, identifier information of a neighboring cell sent by a base station is received, where a CGI and a PCI that are included in the identifier information of the neighboring cell are obtained for the neighboring cell and sent to the base station by a user equipment, when a first CGI is found according to cell information, and the CGI and the PCI that are included in the identifier information of the neighboring cell, it is determined whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, the first CGI is determined as a CGI of the neighboring cell, and when the first CGI is the same as the CGI included in the identifier information of the neighboring cell, the CGI included in the identifier information of the neighboring cell is determined as a CGI of the neighboring cell, the PLMN information set corresponding to the neighboring cell is sent to the base station, and information used for indicating the CGI of the neighboring cell is sent, so that the base station may obtain the correct CGI of the neighboring cell, and the base station may better implement the ANR function.

When the method 100 for obtaining neighboring cell information in the embodiment of the present invention is executed by the OSS, the embodiment of the present invention may further include a method 200 for obtaining neighboring cell information that is executed by a base station.

Figure 4:
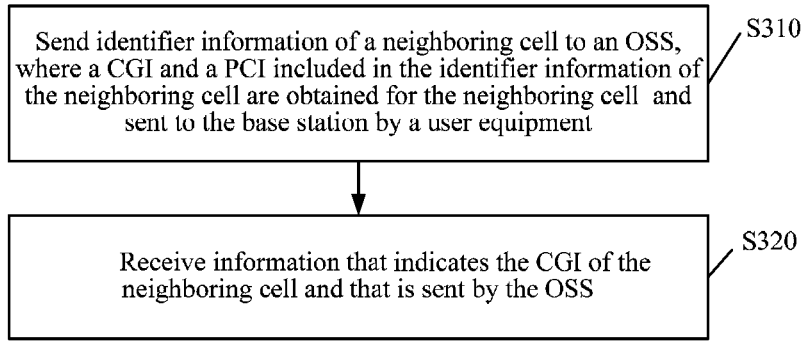
FIG. 4 is a schematic flow chart of a method for obtaining neighboring cell information according to another embodiment of the present invention.

FIG. 4 is a schematic flow chart of a method 300 for obtaining neighboring cell information according to an embodiment of the present invention. The method 300 may be executed by a base station, and as shown in FIG. 4, the method 300 includes:

S310: Send identifier information of a neighboring cell to an OSS, where a CGI and a PCI that are included in the identifier information of the neighboring cell are obtained for the neighboring cell and sent to the base station by a user equipment, so that when finding a first CGI according to cell information, and the CGI and the PCI that are included in the identifier information of the neighboring cell, the OSS determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and; when the first CGI is the same as the CGI included in the identifier information of the neighboring cell, determines the CGI included in the identifier information of the neighboring cell as a CGI of the neighboring cell.

S320: Receive information that indicates the CGI of the neighboring cell and that is sent by the OSS.

In the embodiment of the present invention, the method 300 may further include:

receiving a PLMN information set that corresponds to the neighboring cell and that is sent by the OSS, so that the base station may better implement an ANR function.

Therefore, in the method for obtaining neighboring cell information in the embodiment of the present invention, identifier information of a neighboring cell is sent to an OSS, where a CGI and a PCI that are included in the identifier information of the neighboring cell are obtained for the neighboring cell and sent to the base station by a user equipment, so that when finding a first CGI according to cell information, and the CGI and the PCI that are included in the identifier information of the neighboring cell, the OSS determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and when the first CGI is the same as the CGI included in the identifier information of the neighboring cell, determines the CGI included in the identifier information of the neighboring cell as a CGI of the neighboring cell; and information that indicates the CGI of the neighboring cell and that is sent by the OSS is received, so that the base station may obtain a correct CGI of the neighboring cell, and the base station may better implement an ANR function.

The foregoing describes the method for obtaining neighboring cell information according to the embodiment of the present invention with reference to FIG. 1 to FIG. 4, and the following describes an apparatus for obtaining neighboring cell information, that is, an OSS and a base station, according to an embodiment of the present invention with reference to FIG. 5 to FIG. 9.

Figure 5:
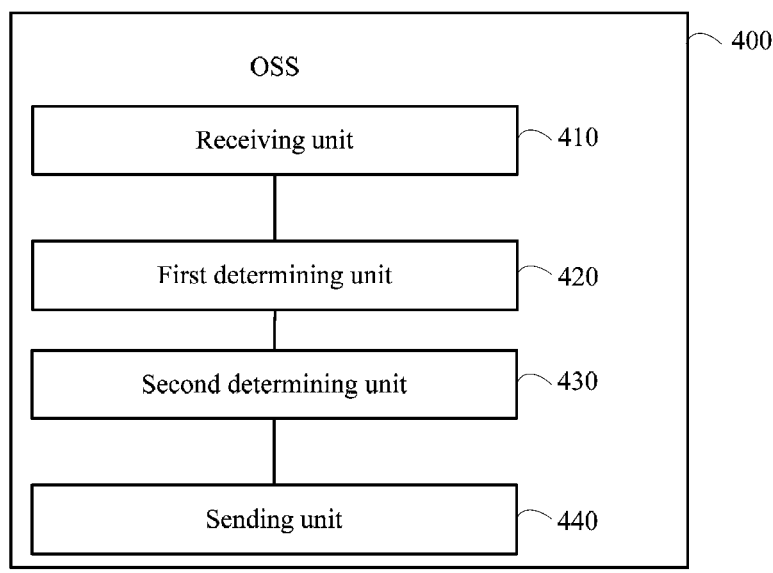
FIG. 5 is a schematic block diagram of an OSS according to an embodiment of the present invention.

FIG. 5 is a schematic block diagram of an OSS 400 according to an embodiment of the present invention. As shown in FIG. 5, the OSS 400 includes:

a receiving unit 410, configured to receive identifier information of a neighboring cell sent by a base station, where a CGI and a PCI that are included in the identifier information of the neighboring cell are obtained for the neighboring cell and sent to the base station by a user equipment;

a first determining unit 420, configured to: when finding a first CGI according to cell information, and the CGI and the PCI that are included in the identifier information of the neighboring cell, determine whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell;

a second determining unit 430, configured to: when the first CGI is different from the CGI included in the identifier information of the neighboring cell, determine the first CGI as a CGI of the neighboring cell, and when the first CGI is the same as the CGI included in the identifier information of the neighboring cell, determine the CGI included in the identifier information of the neighboring cell as a CGI of the neighboring cell; and a sending unit 440, configured to send, to the base station, information used for indicating the CGI of the neighboring cell.

Figure 6:
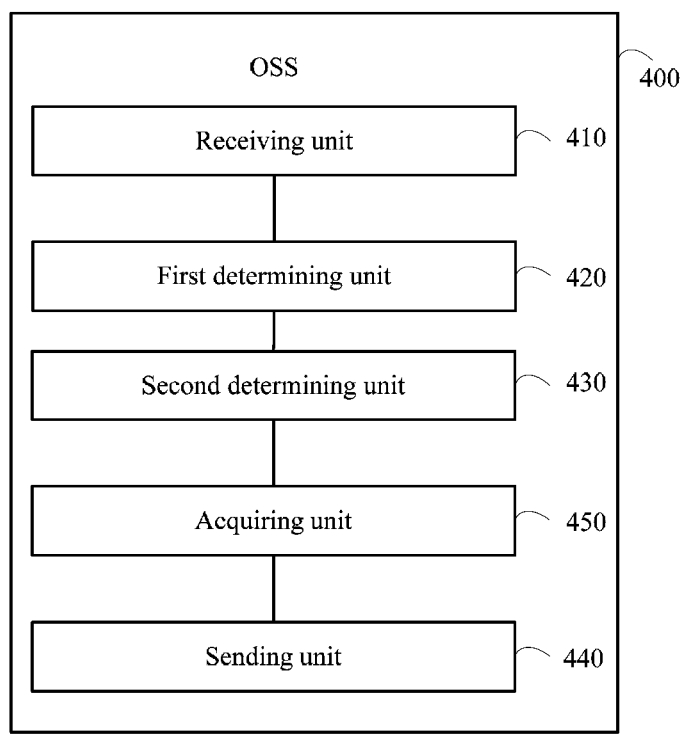
FIG. 6 is a schematic block diagram of an OSS according to another embodiment of the present invention.

Optionally, as shown in FIG. 6, the OSS 400 further includes:

an obtaining unit 450, configured to obtain, according to the CGI of the neighboring cell and a correspondence between all or part of information in the CGI and a public land mobile network PLMN information set, a PLMN information set corresponding to the neighboring cell, where the sending unit 440 is further configured to send, to the base station, the PLMN information set corresponding to the neighboring cell.

Optionally, the obtaining unit 450 is specifically configured to:

determine, according to the CGI of the neighboring cell and a correspondence between the CGI and a PLMN information set, the PLMN information set corresponding to the neighboring cell.

Optionally, the obtaining unit 450 is specifically configured to:

determine, according to a PLMN identifier id included in the CGI of the neighboring cell and a correspondence between the PLMN id in the CGI and a PLMN information set, the PLMN information set corresponding to the neighboring cell.

Optionally, the obtaining unit 450 is specifically configured to:

determine, according to a base station id and a cell id that are included in the CGI of the neighboring cell and a correspondence between the base station id and the cell id in the CGI and a PLMN information set, the PLMN information set corresponding to the neighboring cell.

Optionally, the obtaining unit 450 is specifically configured to:

obtain, according to a PLMN id included in the CGI of the neighboring cell and a correspondence between a PLMN id and a first correspondence, a first correspondence corresponding to the PLMN id included in the CGI of the neighboring cell, where the first correspondence is a correspondence between a base station id, a cell id and a PLMN information set; and determine, according to the base station id and cell id included in the CGI of the neighboring cell and the first correspondence corresponding to the PLMN id included in the CGI of the neighboring cell, the PLMN information set corresponding to the neighboring cell.

Therefore, according to the embodiment of the present invention, the OSS receives identifier information of a neighboring cell sent by a base station, where a CGI and a PCI that are included in the identifier information of the neighboring cell are obtained for the neighboring cell and sent to the base station by a user equipment, when a first CGI is found according to cell information, and the CGI and the PCI that are included in the identifier information of the neighboring cell, determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and when the first CGI is the same as the CGI included in the identifier information of the neighboring cell, determines the CGI included in the identifier information of the neighboring cell as a CGI of the neighboring cell, sends the PLMN information set corresponding to the neighboring cell to the base station, and sends information used for indicating the CGI of the neighboring cell, so that the base station may obtain a correct CGI of the neighboring cell, and the base station may better implement an ANR function.

Figure 7:
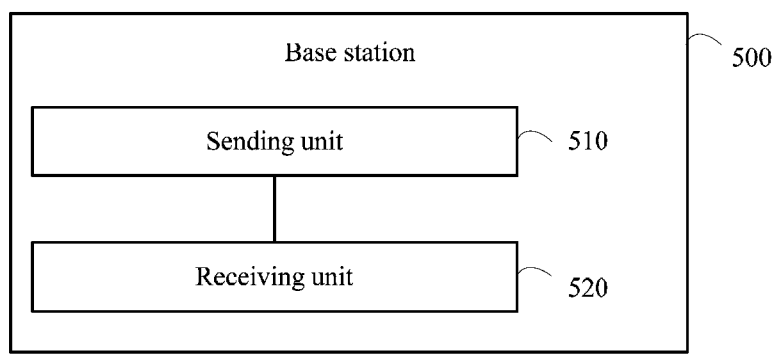
FIG. 7 is a schematic block diagram of a base station according to an embodiment of the present invention.

FIG. 7 is a schematic block diagram of a base station 500 according to an embodiment of the present invention. As shown in FIG. 7, the base station 500 includes:

a sending unit 510, configured to send identifier information of a neighboring cell to an OSS, where a CGI and a PCI that are included in the identifier information of the neighboring cell are obtained for the neighboring cell and sent to the base station by a user equipment, so that when finding a first CGI according to cell information, and the CGI and the PCI that are included in the identifier information of the neighboring cell, the OSS determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and when the first CGI is the same as the CGI included in the identifier information of the neighboring cell, determines the CGI included in the identifier information of the neighboring cell as a CGI of the neighboring cell; and a receiving unit 520, configured to receive information that indicates the CGI of the neighboring cell and that is sent by the OSS.

Optionally, the receiving unit 520 is further configured to:

receive the PLMN information set that corresponds to the neighboring cell and that is sent by the OSS.

Therefore, according to the embodiment of the present invention, a base station sends identifier information of a neighboring cell to an OSS, where a CGI and a PCI that are included in the identifier information of the neighboring cell are obtained for the neighboring cell and sent to the base station by a user equipment, so that when finding a first CGI according to cell information, and the CGI and the PCI that are included in the identifier information of the neighboring cell, the OSS determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and; when the first CGI is the same as the CGI included in the identifier information of the neighboring cell, determines the CGI included in the identifier information of the neighboring cell as a CGI of the neighboring cell; and receives information that indicates the CGI of the neighboring cell and that is sent by the OSS, so as to obtain a correct CGI of the neighboring cell, and better implement an ANR function.

Figure 8:
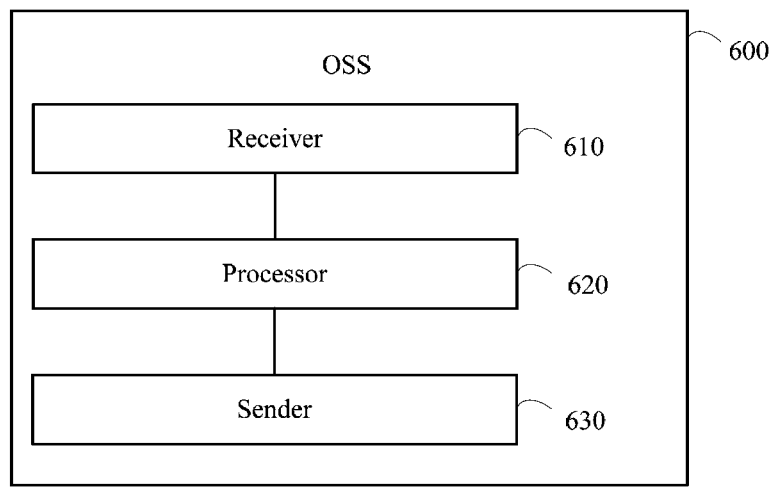
FIG. 8 is a schematic block diagram of an OSS according to another embodiment of the present invention.

FIG. 8 is a schematic block diagram of an OSS 600 according to an embodiment of the present invention. The OSS 600 includes:

a receiver 610, configured to receive identifier information of a neighboring cell sent by a base station, where a CGI and a PCI that are included in the identifier information of the neighboring cell are obtained for the neighboring cell and sent to the base station by a user equipment;

a processor 620, configured to: when finding a first CGI according to cell information, and the CGI and the PCI that are included in the identifier information of the neighboring cell, determine whether the first CGI is the same as a CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determine the first CGI as a CGI of the neighboring cell, and when the first CGI is the same as the CGI included in the identifier information of the neighboring cell, determine the CGI included in the identifier information of the neighboring cell as a CGI of the neighboring cell; and a sender 630, configured to send, to the base station, information used for indicating the CGI of the neighboring cell.

Optionally, the processor 620 is further configured to:

obtain, according to the CGI of the neighboring cell and a correspondence between all or part of information in the CGI and a public land mobile network PLMN information set, a PLMN information set corresponding to the neighboring cell, where the sender 630 is further configured to send, to the base station, the PLMN information set corresponding to the neighboring cell.

Optionally, the processor 620 is specifically configured to:

determine, according to the CGI of the neighboring cell and a correspondence between the CGI and a PLMN information set, the PLMN information set corresponding to the neighboring cell.

Optionally, the processor 620 is specifically configured to:

determine, according to a PLMN identifier id included in the CGI of the neighboring cell and a correspondence between the PLMN id in the CGI and a PLMN information set, the PLMN information set corresponding to the neighboring cell.

Optionally, the processor 620 is specifically configured to:

determine, according to a base station id and a cell id that are included in the CGI of the neighboring cell and a correspondence between the base station id and the cell id in the CGI and a PLMN information set, the PLMN information set corresponding to the neighboring cell.

Optionally, the processor 620 is specifically configured to:

obtain, according to the PLMN id included in the CGI of the neighboring cell and a correspondence between a PLMN id and a first correspondence, a first correspondence corresponding to the PLMN id included in the CGI of the neighboring cell, where the first correspondence is a correspondence between a base station id, a cell id and a PLMN information set; and determine, according to the base station id and cell id included in the CGI of the neighboring cell and the first correspondence corresponding to the PLMN id included in the CGI of the neighboring cell, the PLMN information set corresponding to the neighboring cell.

Therefore, according to the embodiment of the present invention, the OSS receives identifier information of a neighboring cell sent by a base station, where a CGI and a PCI that are included in the identifier information of the neighboring cell are obtained for the neighboring cell and sent to the base station by a user equipment, when a first CGI is found according to cell information, and the CGI and the PCI that are included in the identifier information of the neighboring cell, determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and when the first CGI is the same as the CGI included in the identifier information of the neighboring cell, determines the CGI included in the identifier information of the neighboring cell as a CGI of the neighboring cell, sends the PLMN information set corresponding to the neighboring cell to the base station, and sends information used for indicating the CGI of the neighboring cell, so that the base station may obtain a correct CGI of the neighboring cell, and the base station may better implement an ANR function.

Figure 9:
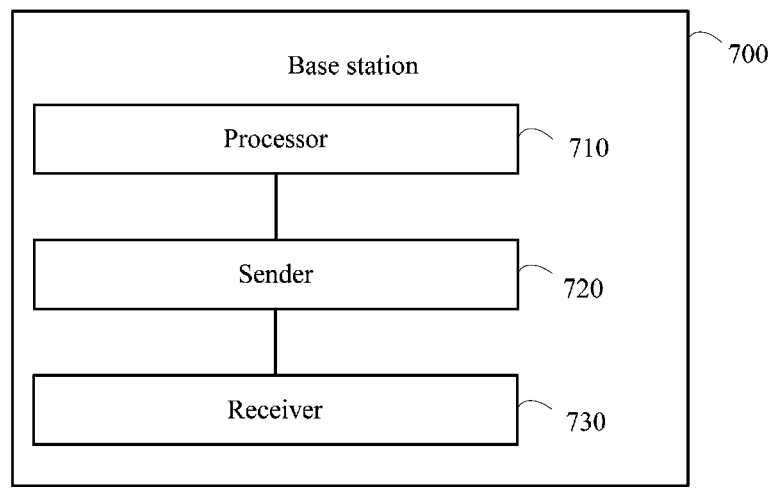
FIG. 9 is a schematic block diagram of a base station according to another embodiment of the present invention.

FIG. 9 is a schematic block diagram of a base station 700 according to an embodiment of the present invention. As shown in FIG. 9, the base station 700 includes:

a processor 710, configured to send identifier information of a neighboring cell to an OSS, where a CGI and a PCI that are included in the identifier information of the neighboring cell are obtained for the neighboring cell and sent to the base station by a user equipment;

a sender 720, configured to send identifier information of a neighboring cell to an OSS, where a CGI and a PCI that are included in the identifier information of the neighboring cell are obtained for the neighboring cell and sent to the base station by a user equipment, so that when finding a first CGI according to cell information, and the CGI and the PCI that are included in the identifier information of the neighboring cell, the OSS determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and when the first CGI is the same as the CGI included in the identifier information of the neighboring cell, determines the CGI included in the identifier information of the neighboring cell as a CGI of the neighboring cell; and a receiver 730, configured to receive information that indicates the CGI of the neighboring cell and that is sent by the OSS.

Optionally, the receiver 730 is further configured to:

receive the PLMN information set that corresponds to the neighboring cell and that is sent by the OSS.

Therefore, according to the embodiment of the present invention, a base station sends identifier information of a neighboring cell to an OSS, where a CGI and a PCI that are included in the identifier information of the neighboring cell are obtained for the neighboring cell and sent to the base station by a user equipment, so that when finding a first CGI according to cell information, and the CGI and the PCI that are included in the identifier information of the neighboring cell, the OSS determines whether the first CGI is the same as the CGI included in the identifier information of the neighboring cell, where the first CGI and the CGI included in the identifier information of the neighboring cell have a same base station id and cell id, and a PCI corresponding to the first CGI is the same as the PCI included in the identifier information of the neighboring cell, when the first CGI is different from the CGI included in the identifier information of the neighboring cell, determines the first CGI as a CGI of the neighboring cell, and when the first CGI is the same as the CGI included in the identifier information of the neighboring cell, determines the CGI included in the identifier information of the neighboring cell as a CGI of the neighboring cell; and receives information that indicates the CGI of the neighboring cell and that is sent by the OSS, so as to obtain a correct CGI of the neighboring cell, and better implement an ANR function.

A person of ordinary skill in the art may be aware that, units and algorithm steps of each example described With reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person skilled in the art may clearly understand that, for the purpose of convenient and brief description, for a detailed working process of the foregoing system, apparatus, and unit, reference may be made to the corresponding process in the foregoing method embodiments, and details are not described here.

In the several embodiments provided in the present application, it should be understood that the disclosed system, apparatus, and method may be implemented in other manners. For example, the described apparatus embodiment is merely exemplary. For example, dividing of the units is merely a type of logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, each of the units may exist alone physically, and two or more units may also be integrated into one unit.

When the functions are implemented in a form of a software functional unit and sold or used as an independent product, the functions may be stored in a computer-readable storage medium. Based on such understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that is capable of storing program codes, such as a USB flash disk, a removable hard disk, a read-only memory (Read-Only Memory, ROM), a random access memory (Random Access Memory, RAM), a magnetic disk, or an optical disk.

The foregoing description is merely specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for maintaining correct information for a neighboring cell at a base station, comprising:
   receiving, by a network operations management node, neighboring cell identifier information for the neighboring cell, sent by the base station, the neighboring cell identifier information comprising a Cell Global Identifier (CGI) and a Physical Cell Identifier (PCI) sent to the base station by a user equipment;
   finding, within a preconfigured neighboring cell information accessible by the network operations management node, a first CGI entry according to:
      a base station identifier (BSID) and cell identifier (CID) of the CGI of the neighboring cell identifier information, and
      the PCI of the neighboring cell identifier information;
   first determining that the first CGI entry is a sole entry, of the preconfigured neighboring cell identification information, having a combination of BSID, CID and PCI values that matches the BSID, CID and PCI of the neighboring cell identifier information;
   second determining whether a first CGI of the first CGI entry is the same as the CGI of the neighboring cell identifier information; and
   sending, to the base station after the first determining and second determining, CGI indication information for the CGI of the neighboring cell identification information, wherein during the sending, the network operations management node sends:
      an indication that the CGI in the neighboring cell identifier information is correct, if the first CGI is the same as the CGI of the neighboring cell identifier information, and the first CGI, for replacement of the CGI of the neighboring cell identifier information on the base station by the first CGI, if the first CGI differs from the CGI of the neighboring cell identifier information.

2. The method according to claim 1, further comprising:
obtaining, according to the CGI of the neighboring cell identifier information and a correspondence between part of information in the CGI and a Public Land Mobile Network (PLMN) information set, a PLMN information set corresponding to the neighboring cell; and
sending, to the base station, the PLMN information set corresponding to the neighboring cell.

3. The method according to claim 2, wherein obtaining the PLMN information set corresponding to the neighboring cell comprises:
determining, according to the CGI of the neighboring cell and a correspondence between the CGI and the PLMN information set, the PLMN information set corresponding to the neighboring cell.

4. The method according to claim 2, wherein obtaining the PLMN information set corresponding to the neighboring cell comprises:
determining, according to a PLMN identifier id comprised in the CGI of the neighboring cell and a correspondence between the PLMN id comprised in the CGI and the PLMN information set, the PLMN information set corresponding to the neighboring cell.

5. The method according to claim 2, wherein obtaining the PLMN information set corresponding to the neighboring cell comprises:
determining, according to a base station id and a cell id comprised in the CGI of the neighboring cell and a correspondence between the base station id and the cell id comprised in the CGI and the PLMN information set, the PLMN information set corresponding to the neighboring cell.

6. The method according to claim 2, wherein obtaining the PLMN information set corresponding to the neighboring cell comprises:
obtaining, according to a PLMN id comprised in the CGI of the neighboring cell and a correspondence between a PLMN id and a first correspondence, a first correspondence corresponding to the PLMN id comprised in the CGI of the neighboring cell, wherein the first correspondence is a correspondence between a base station id, a cell id and the PLMN information set; and
determining, according to the base station id and cell id comprised in the CGI of the neighboring cell and the first correspondence corresponding to the PLMN id comprised in the CGI of the neighboring cell, the PLMN information set corresponding to the neighboring cell.

7. The method according to claim 2, wherein the PLMN information set comprises a PLMN id set or comprises:
a PLMN id and operator state set.

8. The method according to claim 1, wherein second determining whether the first CGI is the same as the CGI comprised in the identifier information of the neighboring cell, comprises:
determining whether a PLMN id of the first CGI is consistent with a PLMN id in the CGI comprised in the identifier information of the neighboring cell.

9. The method according to claim 2, wherein second determining whether the first CGI is the same as the CGI comprised in the identifier information of the neighboring cell, comprises:
determining whether a PLMN id of the first CGI is consistent with a PLMN id in the CGI comprised in the identifier information of the neighboring cell.

10. A method for maintaining correct information for a neighboring cell at a base station, comprising:
sending, by a base station, neighboring cell identifier information for the neighboring cell to an Operation Support System (OSS), the neighboring cell identifier information comprising a Cell Global Identifier (CGI) and a Physical Cell Identifier (PCI) sent to the base station by a user equipment, so that the OSS:
finds, within preconfigured neighboring cell information accessible by the network operations management node, a first CGI entry according to: a base station identifier and cell identifier of the CGI of the neighboring cell identifier information, and the PCI of the neighboring cell identifier information,
first determines that the first CGI entry is a sole entry, of the preconfigured neighboring cell identification information, having a combination of BSID, CID and PCI values that matches the BSID, CID and PCI of the neighboring cell identifier information, and
second determines whether a first CGI of the first CGI entry is the same as the CGI of the neighboring cell identifier information; and
receiving, by the base station from the OSS after the first determining and second determining by the OSS, CGI indication information for the CGI of the neighboring cell identification information, wherein during the receiving, the base station receives:
an indication that the CGI in the neighboring cell identifier information is correct, if the first CGI is the same as the CGI of the neighboring cell identifier information, and
the first CGI, for replacement of the CGI of the neighboring cell identifier information on the base station by the first CGI, if the first CGI differs from the CGI of the neighboring cell identifier information.

11. The method according to claim 10, further comprising:
receiving a PLMN information set that corresponds to the neighboring cell and that is sent by the OSS.

12. An Operation Support System (OSS), comprising:
a computing hardware; and
a non-transitory computer readable medium comprising computer executable instructions that, when executed by the computing hardware, cause the OSS to execute a method for maintaining correct information for a neighboring cell at a base stations, the method comprising:
receiving, by a network operations management node, neighboring cell identifier information for the neighboring cell, sent by the base station, the neighboring cell identifier information comprising a Cell Global Identifier (CGI) and a Physical Cell Identifier (PCI) sent to the base station by a user equipment;
finding, within preconfigured neighboring cell information accessible by the network operations management node, a first CGI entry according to:
a base station identifier and cell identifier of the CGI of the neighboring cell identifier information, and
the PCI of the neighboring cell identifier information;

first determining that the first CGI entry is a sole entry, of the preconfigured neighboring cell identification information, having a combination of BSID, CID and PCI values that match the BSID, CID and PCI of the neighboring cell identifier information;

second determining whether a first CGI of the first CGI entry is the same as the CGI of the neighboring cell identifier information; and sending, to the base station after the first determining and second determining, CGI indication information for the CGI of the neighboring cell identification information, wherein during the sending, the network operations management node sends:

an indication that the CGI in the neighboring cell identifier information is correct, if the first CGI is the same as the CGI of the neighboring cell identifier information, and the first CGI, for replacement of the CGI of the neighboring cell identifier information on the base station by the first CGI, if the first CGI differs from the CGI of the neighboring cell identifier information.

13. The OSS according to claim 12, further comprising computer-executable instructions for:

obtaining, according to the CGI of the neighboring cell and a correspondence between all or part of information in the CGI and a Public Land Mobile Network (PLMN) information set, a PLMN information set corresponding to the neighboring cell, wherein the sending further comprises sending, to the base station, the PLMN information set corresponding to the neighboring cell.

14. The OSS according to claim 13, wherein the obtaining further comprises:

determining, according to the CGI of the neighboring cell and a correspondence between the CGI and the PLMN information set, the PLMN information set corresponding to the neighboring cell.

15. The OSS according to claim 13, wherein the obtaining further comprises:

determining, according to a PLMN identifier id comprised in the CGI of the neighboring cell and a correspondence between the PLMN id in the CGI and the PLMN information set, the PLMN information set corresponding to the neighboring cell.

16. The OSS according to claim 13, wherein the obtaining further comprises:

determining, according to a base station id and a cell id comprised in the CGI of the neighboring cell and a correspondence between the base station id and the cell id in the CGI and the PLMN information set, the PLMN information set corresponding to the neighboring cell.

17. The OSS according to claim 13, wherein the obtaining further comprises:

obtaining, according to a PLMN id comprised in the CGI of the neighboring cell and a correspondence between the PLMN id and a first correspondence, a first correspondence corresponding to the PLMN id comprised in the CGI of the neighboring cell, wherein the first correspondence is a correspondence between a base station id, a cell id and the PLMN information set; and determining, according to the base station id and cell id comprised in the CGI of the neighboring cell and the first correspondence corresponding to the PLMN id comprised in the CGI of the neighboring cell, the PLMN information set corresponding to the neighboring cell.

18. The OSS according to claim 13, wherein when finding the first CGI entry according to the cell information, and the CGI and the PCI comprised in the identifier information of the neighboring cell, determining whether a PLMN id of the first CGI is consistent with a PLMN id in the CGI comprised in the identifier information of the neighboring cell.

19. A base station, comprising:

a processing hardware; and a non-transitory computer-readable medium comprising computer executable instructions that, when executed on the processing hardware, cause the base station to perform a method for maintaining correct information for a neighboring cell at the base stations, the method comprising:

sending, by a base station, neighboring cell identifier information for the neighboring cell to an Operation Support System (OSS), the neighboring cell identifier information comprising a Cell Global Identifier (CGI) and a Physical Cell Identifier (PCI) sent to the base station by a user equipment, so that the OSS:

finds, within preconfigured neighboring cell information accessible by the network operations management node, a first CGI entry according to: a base station identifier and cell identifier of the CGI of the neighboring cell identifier information, and the PCI of the neighboring cell identifier information, first determines that the first CGI entry is a sole entry, of the preconfigured neighboring cell identification information, having a combination of BSID, CID and PCI values that match the BSID, CID and PCI of the neighboring cell identifier information, and second determines whether a first CGI of the first CGI entry is the same as the CGI of the neighboring cell identifier information; and receiving, by the base station from the OSS after the first determining and second determining by the OSS, CGI indication information for the CGI of the neighboring cell identification information, wherein during the receiving, the base station receives:

an indication that the CGI in the neighboring cell identifier information is correct, if the first CGI is the same as the CGI of the neighboring cell identifier information, and the first CGI, for replacement of the CGI of the neighboring cell identifier information on the base station by the first CGI, if the first CGI differs from the CGI of the neighboring cell identifier information.

20. The base station according to claim 19, wherein the receiving unit is further configured to:

receive a PLMN information set that corresponds to the neighboring cell and that is sent by the OSS.

* * * * *